United States Patent
Kinose et al.

(10) Patent No.: US 7,083,772 B2
(45) Date of Patent: Aug. 1, 2006

(54) AQUEOUS SOLUTION OF ZINC NITRITE AND METHOD FOR PRODUCTION THEREOF

(75) Inventors: Yutaka Kinose, Tokyo (JP); Toru Hata, Tokyo (JP); Eriko Okuno, Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 172 days.

(21) Appl. No.: 10/466,182

(22) PCT Filed: Jan. 11, 2002

(86) PCT No.: PCT/JP02/00146

§ 371 (c)(1), (2), (4) Date: Jul. 14, 2003

(87) PCT Pub. No.: WO02/057509

PCT Pub. Date: Jul. 25, 2002

(65) Prior Publication Data

US 2004/0052717 A1  Mar. 18, 2004

(30) Foreign Application Priority Data

Jan. 17, 2001   (JP)  ............................. 2001-008768

(51) Int. Cl.
*C01B 21/06* (2006.01)
*B01D 61/44* (2006.01)

(52) U.S. Cl. ...................... 423/385; 204/523; 204/529

(58) Field of Classification Search ................ 423/385; 204/523, 529
See application file for complete search history.

(56) References Cited

U.S. PATENT DOCUMENTS 6,572,834 B1 * 6/2003 Kinose et al. .............. 423/385

FOREIGN PATENT DOCUMENTS

| JP | 2000-44224 A | 2/2000 |
| JP | 2001-323384 A | 11/2001 |
| JP | 2001-323386 A | 11/2001 |

* cited by examiner

*Primary Examiner*—Wayne A. Langel
(74) *Attorney, Agent, or Firm*—Sughrue Mion, PLLC

(57) ABSTRACT

An aqueous zinc nitrite solution which contains substantially no calcium (Ca) ions is provided, in which, in terms of the aqueous zinc nitrite [$Zn(NO_2)_2$] solution having an $NO_2$ concentration of 10% by weight, the sodium (Na) ion concentration is 200 to 2000 ppm and the sulfate ($SO_4$) ion concentration is 20 ppm or less in the solution. The aqueous zinc nitrite solution can be prepared by providing a zinc compound and an alkali nitrite as raw materials and subjecting the raw materials to electrolytic synthesis through a double decomposition reaction using an ion-exchange membrane as a diaphragm. As the aqueous zinc nitrite solution is provided, an extremely efficient metal surface treatment is made possible which has a reduced amount of sodium ions. In particular, it contains substantially no sulfate ions and no calcium ions.

7 Claims, 1 Drawing Sheet

A1, A2: ANION-EXCHANGE MEMBRANE
C1, C2: CATION-EXCHANGE MEMBRANE

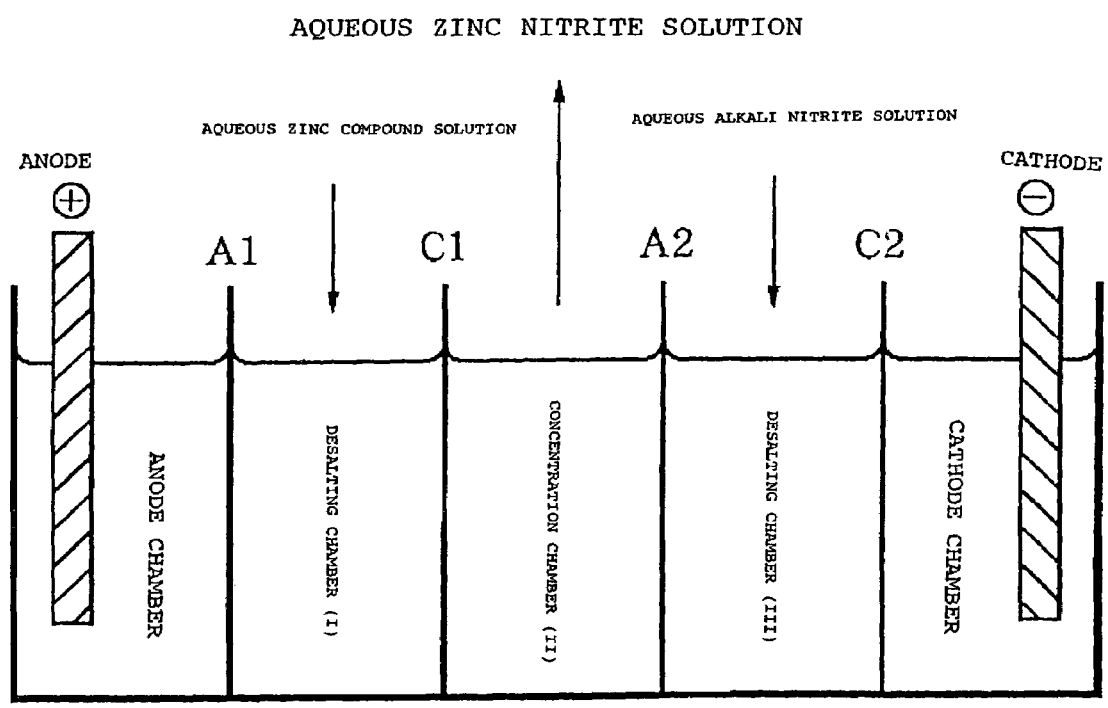

AQUEOUS SOLUTION OF ZINC NITRITE AND METHOD FOR PRODUCTION THEREOF

TECHNICAL FIELD

The present invention relates to an aqueous zinc nitrite solution and a method for preparing the same. More particularly, the present invention relates to: an aqueous zinc nitrite solution making extremely efficient metal surface treatment possible, where the amount of sodium ions is reduced and in particular a sulfate ions and calcium ions are substantially not present, making, in particular, a closed system of film-forming treatment on metal possible; and a method for preparing the same.

BACKGROUND ART

Zinc nitrite is known to decompose at around 100° C. with release of nitrogen oxide when slowly heated in air. Also, zinc nitrite is known to be soluble in water and vulnerable to hydrolysis and forms zinc oxynitrite $[ZnO.Zn(NO_2)_2]$ upon evaporation of its aqueous solution.

Generally, such zinc nitrite is prepared by a method of mixing zinc sulfate with an ethanol solution of sodium nitrite, filtering the resulting precipitate, and evaporating and concentrating the filtrate to obtain crystals (see "Kagaku Daijiten" published on Mar. 15, 1984 by KYORITSU SHUPPAN CO., LTD.).

However, this method, which is a method in which sodium sulfate is separated and removed by utilizing the difference in solubility between zinc nitrite and sodium sulfate, requires the use of ethanol, and the operations of evaporation and concentration. The method has problems in that it inevitably causes an increase in cost, sodium ions are also allowed to remain, and the like.

Therefore, it is currently difficult to obtain high purity zinc nitrite or its aqueous solution on an industrial scale.

Further, as a pretreatment process prior to painting of a metal surface, a series of steps of degreasing, washing with water, film forming treatment, washing with water, and drying is generally included. As an example of the film forming treatment, a treating method for forming a film of zinc phosphate on the surface of steel is commonly adopted. As a film-forming agent used for this purpose, a treating liquid prepared by dissolving zinc in phosphoric acid and diluting the resulting solution with water has been used. This treatment is termed "metal surface treatment".

Furthermore, in order to promote the film forming reaction of metal, a chemical such as sodium nitrite or sodium chlorate is added to the film-forming agent. These chemicals are called "promoters". Addition of these promoters shows an effect that the forming treatment can be performed at a lower temperature, and the film forming treatment time is reduced.

However, conventional sodium salts such as sodium nitrite and sodium chlorate have a problem in that long usage of a treating bath increases the concentration of Na ions and as a result the pH of the treating bath is elevated so that components of the formed film precipitate in the treating bath. Also, there is a problem in that, when recovering and regenerating the old treating liquid, accumulation of Na ions in the treating bath destroys the balance of the bath so that removal of Na ions from the recovered treating liquid is necessary. Usually, treating liquid containing Na ions must be disposed of as industrial waste.

Further, the issue of environmental protection has recently attracted much attention even in the field of metal surface treating liquids, and attempts are being made to establish a closed system for treating baths.

On this account, more intensive studies than ever before are being made of a metal surface-treating method with a lower generation of sludge.

The present inventors proposed an aqueous zinc nitrite solution distinguished as a film-forming promoter for a metal surface treatment, which contains substantially no sodium ions and no sulfate ions, and is obtained by reacting between zinc sulfate and calcium nitrite at first and then conducting purification (Japanese Patent Application No. 2000-141893). In addition, it is known that the presence of calcium ions in the film-forming promoter causes the promoter to become sludge as calcium phosphate in the surface-treating solution, for example, at the time of mixing with a zinc phosphate film-forming solution. Usually, the sludge is periodically recovered to be prevented from accumulating in a treating bath. However, the operation of collecting the sludge is also complicated, thereby failing to show an industrial advantage.

The present inventors have been dedicated to making repetitive studies of an aqueous zinc nitrite solution useful as a film-forming promoter for a metal surface treatment, and as a result discovered a nitrite aqueous solution having a reduced amount of sodium ions, in particular, containing substantially no sulfate ions and no calcium ions.

In other words, an object of the present is to provide an aqueous zinc nitrite solution that allows extremely efficient metal surface treatment and has a reduced amount of sodium ions, in particular, containing substantially no sulfate ions and no calcium ions, and a method for preparing the same.

DISCLOSURE OF THE INVENTION

Under such circumstances, the present invention has been accomplished on the basis of the knowledge that the generation of sludge is reduced and extremely efficient metal surface treatment is made possible by using an aqueous zinc nitrite solution as a film-forming promoter for the metal surface treatment, in which the aqueous zinc nitrite solution containing substantially no sulfate ions and no calcium ions while containing 500 to 2000 ppm of sodium ions is obtained by providing a zinc compound and an alkali nitrite as raw materials and subjecting the raw materials to electrolytic synthesis through a double decomposition reaction using an ion-exchange membrane as a diaphragm.

Thus, according to a first aspect of the present invention, there is provided an aqueous zinc nitrite solution which contains substantially no calcium (Ca) ions, characterized in that, in terms of the aqueous zinc nitrite $[Zn(NO_2)_2]$ solution having an $NO_2$ concentration of 10% by weight, sodium (Na) ion concentration is 200 to 2000 ppm and sulfate $(SO_4)$ ion concentration is 20 ppm or less in the solution.

Also, according to a second aspect of the present invention, there is provided a method for preparing an aqueous zinc nitrite solution according to claim 1, characterized by including synthesizing a zinc compound and an alkali nitrite as raw materials by a double decomposition reaction using an ion-change membrane as a diaphragm.

It is preferable that the reaction is performed in an electrodialysis cell having a unit including one concentration chamber and two desalting chambers sandwiching the concentration chamber which are formed by an alternate arrangement of cation-exchange membranes and anion-exchange membranes between an anode and a cathode.

Also, it is preferable that, in the method, an aqueous zinc compound solution is supplied to one of the desalting chambers and an aqueous alkali nitrite solution is supplied to the other of the desalting chambers, and zinc ions are introduced through a cation-exchange membrane and nitrite ions are introduced through an anion-exchange membrane into a concentration chamber sandwiched between the desalting chambers, to thereby obtain the objective aqueous zinc nitrite solution.

Also, according to a third aspect of the present invention there is provided an aqueous zinc nitrite solution further including a stabilizing agent.

BRIEF DESCRIPTION OF THE DRAWING

The FIGURE is a schematic view showing the electrodialysis cell used in the method for preparing an aqueous zinc nitrite solution of the present invention.

BEST MODE FOR CARRYING OUT THE INVENTION

Hereinafter, the present invention will be described in detail.

The aqueous zinc nitrite solution of the present invention is a solution that includes a component represented by the general formula $Zn(NO_2)_2$ and $H_2O$ mixed at any optional ratio.

In addition, even though industrial refining of the product obtained by the conventional manufacturing process is accompanied by many difficulties, the aqueous zinc nitrite solution of the present invention is characterized in that the concentration of sodium (Na) ions is reduced, in particular, substantially no sulfate ions ($SO_4$) and no calcium (Ca) ions are contained.

Here, the concentration of zinc nitrite in the aqueous solution is obtained by measuring the concentration of zinc (Zn) ions and the concentration of nitrite ions, and provided as the concentration of $Zn(NO_2)_2$. The concentration of zinc ions is obtained by ICP luminescence spectrometry and the concentration of nitrite ($NO_2$) ions is obtained by ion chromatography.

Furthermore, sodium (Na) ions, sulfate ($SO_4$) ions, and calcium (Ca) ions are all measured by ICP luminescence spectrometry. Here, sulfate ($SO_4$) ions are measured as sulfur (S) and converted to sulfate ions.

Furthermore, the concentrations of sodium (Na) ions, sulfate ($SO_4$) ions, and calcium (Ca) ions in the present invention are calculated by converting into 10% by weight in terms of $NO_2$. The concentration of sodium ions is 200 to 2,000 ppm, preferably 500 to 1500 ppm. The concentration of sulfate ions is 20 ppm or less, preferably 10 ppm or less. In the present invention, furthermore, the expression "contains substantially no calcium (Ca) ions" means that the concentration of calcium (Ca) ions is 100 ppm or less, preferably 10 ppm or less.

In the aqueous zinc nitrite solution of the present invention, the concentration of nitrite ions is 5 to 15% by weight, preferably 9 to 12% by weight, the concentration of Zn ions is 5 to 10% by weight, preferably 7 to 9% by weight, and the concentration of $Zn(NO_2)_2$ is 10 to 25% by weight, preferably 15 to 20% by weight.

In the aqueous zinc nitrite solution of the present invention, sodium ions, in particular, sulfate ($SO_4$) ions and calcium (Ca) ions are reduced in concentration. Therefore, using this in the composition of a film-forming promoter for a metal surface treatment allows the designing of an extremely efficient surface treatment system.

Next, the method for preparing the aqueous zinc nitrite solution of the present invention will be described.

The method for preparing the aqueous zinc nitrite solution of the present invention is characterized in that a zinc compound and an alkali nitrite are, provided as raw materials and subjected to electrolytic synthesis through a double decomposition reaction using an ion-exchange membrane as a diaphragm in the aqueous solution.

The present invention is preferably carried out as follows. That is, in an electrodialysis cell provided with a unit composed of a concentration chamber and two desalting chambers sandwiching the concentration chamber formed by the alternate arrangement of cation-exchange membranes and anion-exchange membranes between the anode and the cathode. Each of the desalting chambers is composed of an anion-exchange membrane on an anode side and a cation-exchange membrane on a cathode side. An aqueous zinc compound solution as a raw material is supplied to the desalting chamber on the anode side and an aqueous alkali nitrite solution is supplied to the desalting chamber on the cathode side. An electric current is applied to introduce zinc ions through a cation-exchange membrane and nitrite ions through an anion-exchange membrane into a concentration chamber sandwiched between two desalting chambers. Therefore, the objective aqueous zinc nitrite solution is obtained in the concentration chamber.

The aqueous zinc compound solution is an aqueous solution prepared by dissolving a water-soluble zinc compound in water. The zinc compound includes, for example, zinc sulfate, zinc nitrate, and zinc chloride, and such compounds may be used singly or in combinations of two or more. Among them, zinc sulfate is preferred from the standpoint of commercial availability and low price.

The concentration of the aqueous zinc compound solution is not particularly restricted but is preferably not higher than the saturation concentration at room temperature, and specifically 0.5 to 2.0 mol/L, still more preferably 0.9 to 1.3 mol/L.

The aqueous alkali nitrite solution, another starting raw material, is an aqueous solution prepared by dissolving a water-soluble alkali nitrite in water. The alkali nitrite includes, for example, sodium nitrite, potassium nitrite, and lithium nitrite, and these may be used singly or in combinations of two or more. Among them, sodium nitrite is preferred from the standpoint of commercial availability and low price.

The concentration of the aqueous solution of a soluble alkali nitrite is not particularly restricted but is preferably not higher than the saturation concentration at room temperature, and specifically 1.5 to 6.0 mol/L, still more preferably 3.0 to 4.5 mol/L.

The cation-exchange membrane that can be used in the present invention is not particularly restricted. For example, Selemion CMV (product of Asahi Glass Co.), Neocepta CM-1 (product of Tokuyama Co.), Nafion 324 (product of DuPont), and the like may be given. on the other hand, the anion-exchange membrane is not particularly restricted and may include Selemion AMV (product of Asahi Glass Co.), Neocepta AM-1 (product of Tokuyama Co.), and the like.

The anode and cathode for use in the electrodialysis cell are each made of a suitable material in a suitable shape depending on the material and an electrodialysis cell configuration, and more specifically, include a metallic material such as platinum, iron, copper, or lead or a carbonaceous material.

The reaction temperature is 10 to 50° C., preferably 20 to 40° C. The current density is 1.0 A/dm$^3$ to limiting current density, preferably 1.5 to 5.0 A/dm$^3$. The current time is 5 to 50 hours, preferably 10 to 40 hours, but is not necessarily restricted to those conditions.

Further, detailed description will be made of the case where the method for preparing an aqueous zinc nitrile solution is carried out using the electrodialysis cell shown in the figure.

In the electrodialysis cell shown in the figure, from the anode side to the cathode side, an anion-exchange membrane (A1), a cation-exchange membrane (C1), an anion-exchange membrane (A2), and a cation-exchange membrane (C2) are arranged in order. In addition, it is provided with an anode chamber/a desalting chamber (I)/a concentration chamber (II)/a desalting chamber (III)/a cathode chamber in that order.

The anode chamber and the cathode chamber are supplied with an electrolyte such as $Na_2SO_4$, NaCl, or $NH_4Br$. Also, the desalting chamber (I) is supplied with the above aqueous zinc compound solution. On the other hand, the desalting chamber (III) is supplied with the above aqueous alkali nitrite solution. By applying the current, an aqueous zinc nitrite solution is produced in the concentration chamber (II).

The concentration of the aqueous zinc nitrite solution obtained in the concentration chamber (II) rises as the current time is extended, but the sodium ion and sulfate ion concentrations of the solution in terms of an aqueous zinc nitrite [$Zn(NO_2)_2$] solution having an $NO_2$ concentration of 10% by weight also tend to rise. Therefore, it is preferable to control the current time such that the sulfate temperature ion concentration will be 20 ppm or less and the sodium ion concentration will be 2000 ppm or less.

In the aqueous zinc nitrite solution of the present invention thus obtained, the concentration of nitrite ions is 5 to 15% by weight, preferably 9 to 12% by weight, the concentration of Zn ions is 5 to 10% by weight, preferably 7 to 9% by weight, and the concentration of $Zn(NO_2)_2$ is 10 to 25% by weight, preferably 15 to 20% by weight.

In addition, in terms of an aqueous zinc nitrite [$Zn(NO_2)_2$] solution having an $NO_2$ concentration of 10% by weight, the sodium concentration is 200 to 2000 ppm, preferably 500 to 1500 ppm, the sulfate ion concentration is 20 ppm or less, preferably 10 ppm or less, and the concentration of calcium is 100 ppm or less, preferably 10 or less. Therefore, the aqueous zinc nitrite solution of the present invention can be used as the composition of the film-forming promoter for metal surface treatment.

Furthermore, according to the method for preparing the aqueous zinc nitrite solution of the present invention, an aqueous solution with a desired zinc nitrite can be obtained. In the present invention, when the sulfate ion concentration as an impurity in the solution in terms of a zinc nitrite solution [$Zn(NO_2)_2$] having an $NO_2$ concentration of 10% by weight is larger than 20 ppm, the remaining sulfate ions may be removed and purified if desired.

The purifying process may include, for example:

(1) a method which includes adding barium ions to the solution to precipitate the sulfate ions as barium sulfate;

(2) a method which includes passing the solution through a cation-exchange resin or an anion-exchange resin; and (3) a method which includes a solvent extraction procedure. Method (1) is Preferred.

More specifically, it is sufficient to add a slight excess of barium ions relative to the residual sulfate ions and the addition amount relative to the residual sulfate ions may be, for example 1.05 to 1.5 equivalents, preferably 1.05 to 1.2 equivalents.

The aqueous zinc nitrite solution of the present invention can be preferably used as a corrosion inhibitor, in particular, a film-forming promoter for metal surface treatment or compositions thereof. The film-forming promoter is an ingredient that forms a film on the surface of a metal by being added into a film-forming solution.

The film formed at this time may be, for example, a zinc phosphate film, an iron phosphate film, or a manganese phosphate film. When using the aqueous zinc nitrite solution of the present invention as a film-forming promoter, zinc phosphate film is particularly preferred. When the aqueous zinc nitrite solution is used as the zinc phosphate film, in the treating bath for forming the zinc phosphate film, the nitrite ions in the zinc nitrite have promoting effects similar to that of the nitrite ions in sodium nitrite. In addition, zinc ions are a major component of zinc phosphate film, so that the both anions and cations in zinc nitrite can exhibit their effect as surface treating agents.

In addition, the aqueous zinc nitrite solution of the present invention is reduced in the concentration of sodium ions and is substantially free of sulfate ions and calcium ions in particular. The generation of sludge can be reduced when the aqueous zinc nitrite solution is used as it is as a film-forming promoter for the metal surface treatment, or the aqueous zinc nitrite solution is used in combination with the conventional film-forming promoter. In addition, when a closed system of metal surface treatment is aimed at, an extremely efficient surface treatment on metal can be expected.

Other film-forming promoters for the metal surface treatment to be used in combination are not particularly restricted but may include, for example, nitrous acid, sodium nitrite, nitrite ammonium, m-nitrobenzene sulfonic acid sodium, a hydrogen peroxide, sodium chlorate, chlorate ammonium, nitric acid, soda nitrate, ammonium nitrate, zinc nitrate, nitrate manganese, cobalt nitrate, calcium nitrate, nitrate magnesium, copper nitrate, and hydroxy amine. These are used alone or in combination with others.

When the aqueous zinc nitrite solution is used as a film-forming promoter, in the range without affecting the characteristics of the metal surface treatment film and the characteristics of the metal surface treatment film-forming agent, a stabilizing agent may be added to stabilize the composition of the aqueous zinc nitrite solution by inhibiting the precipitation of crystals even at lower temperatures.

Such a stabilizing agent may include, for example, an alkali nitrite metal salt, sugar, or a chelating agent.

For the alkali nitrite metal salt, sodium nitrite, lithium nitrite, or the like may be given.

For the sugar, sucrose, glucose, reduction malt sugar, mannitol, xylitol, starch, or the like may be given.

For the chelating agent, tartaric acid, gluconic acid, glycolic acid, glucuronic acid, ascorbic acid, citric acid, malic acid, ethylene diamine tetra-acetic acid, nitrilo triacetic acid, or glycine are given.

The above-mentioned stabilizing agents can be used alone or in combination with others. The addition amount of the stabilizing agent is usually 0.01 to 2% by weight with respect to the aqueous zinc nitrite solution.

EXAMPLES

The following examples illustrate the present invention in further detail, but the present invention is not limited to these examples.

Example 1

Using a 5-cell electrodialyzer with ion-exchange membranes as illustrated in the figure, only $NO_2$ ions and Zn ions were transferred from an anion-exchange membrane (Selemion AMV; product of Asahi Glass Co.) and a cation-exchange membrane (Selemion CMV, product of Asahi Glass Co.) to obtain an aqueous zinc nitrite solution. The experimental process is as follows.

Dissolved in deionized water were 575 g of zinc sulfate $7 \cdot H_2O$ to prepare a 15% by weight aqueous solution of $ZnSO_4$ and this solution was fed to the desalting chamber (I). On the other hand, 600 g of sodium nitrite were dissolved in deionized water to prepare a 30% by weight aqueous solution of $NaNO_2$ and this solution was fed to the desalting chamber (III).

A 1.70% by weight aqueous solution of zinc nitrite was placed in the concentrating chamber (II). The anode chamber and the cathode chamber were supplied with a 3.0% by weight aqueous solution of $Na_2SO_4$. Anion-exchange membranes (A1, A2) and cation-exchange membranes (C1, C2) each having an effective membrane area of about 120 cm$^2$ were alternately arranged as shown in the figure. While the solutions were circulated with respective pumps to maintain uniformity of the concentration of the solution in each chamber, a voltage of 5 V was applied to the ion-exchange membranes to carry out an ion-exchange double decomposition reaction for 40 hours, whereby an aqueous solution of zinc nitrite was obtained. Note that, in the resulting aqueous solution of zinc nitrite [$Zn(NO_2)_2$], the concentration of zinc nitrite was 17.7% by weight and, assuming that the concentration of said aqueous zinc nitrite solution to be 10% by weight as $NO_2$, the sodium ion amount was 1188 ppm, the sulfate ion amount was 10 ppm, and the calcium ion amount was 1 ppm.

The relationship between the concentration of Zn ions and the concentration of $NO_2$ ions in the aqueous zinc nitrite solution of The concentration chamber (II) at dialysis time and also the relationship among the contents of sodium ions, sulfate ions, and calcium ions are shown in Table 1.

sulfate ion amount was 10 ppm, and the calcium ion amount was 1 ppm, followed by being sealed and left for 30 days at 5° C. in a refrigerator. After standing, the presence or absence of precipitate was confirmed by visual observation.

In the table, "absence" means that there was no precipitate.

Also, in Table 2, "Brending amount" indicates the addition amount with respect to the aqueous zinc nitrite solution.

TABLE 2

| | Stabilizing agent | | |
|---|---|---|---|
| | Kind | Blending amount (wt %) | Presence or absence of precipitate |
| Example 2 | Sodium nitrite | 2 | Absence |
| Example 3 | Starch | 1 | Absence |
| Example 4 | Citric acid | 0.5 | Absence |
| Example 5 | EDTA | 0.1 | Absence |

(Note) "EDTA" in Table 2 represents ethylene diamine tetra-acetic acid.

INDUSTRIAL APPLICABILITY

As described above, the aqueous zinc nitrite solution of the present invention is characterized by having a reduced concentration of sodium ions, and particularly being substantially free of sulfate ions and calcium ions in particular. The aqueous zinc nitrite solution is used as a film-forming promoter for metal surface treatment or the composition thereof. For instance, in the case of forming a zinc phosphate film on the surface of steel or zinc by being added in a surface-treating agent of a zinc-phosphate system, the accumulation of ion impurities in a treating bath is small, the generation of sludge is also decreased, and the frequency of replacing the liquid is greatly decreased. Also, when a closed system is aimed at, an extremely efficient metal surface treatment can be expected.

TABLE 1

| | Concentration chamber (II) | | | | | | |
|---|---|---|---|---|---|---|---|
| Current Time (hr) | Concentration of Zn ions (ppm) | Concentration of $NO_2$ ions (ppm) | Concentration of Na ions (ppm) | Concentration of Ca ions (ppm) | Concentration of $SO_4$ ions (ppm) | Mole Ratio $NO_2$/Zn (ppm) | Concentration of $Zn(NO_2)_2$ ions (wt %) |
| 0 | 7444 | 9883 | 20 | N.D. | 0.7 | 1.89 | 1.7 |
| 1 | 10636 | 15191 | 117 | N.D. | 2.4 | 2.03 | 2.5 |
| 10 | 34018 | 48000 | 448 | N.D. | 4.8 | 2.00 | 7.7 |
| 19 | 54875 | 76976 | 693 | N.D. | 7.4 | 1.99 | 12.0 |
| 29 | 71118 | 102265 | 954 | N.D. | 7.6 | 2.04 | 15.4 |
| 40 | 84299 | 119308 | 1188 | N.D. | 10 | 2.01 | 17.7 |

(Note)
N.D. in the table indicates a detection limit of 1 ppm or less.

Examples 2 to 5

The concentration of zinc nitrite prepared by Example 1 was 17% by weight, and the stabilizing agents listed below were added, while assuming that the concentration of the aqueous zinc nitrite [$Zn(NO_2)_2$] solution to be 10% by weight as $NO_2$, the sodium ion amount was 1188 ppm, the Also, according the method for preparing an aqueous zinc nitrite solution, the aqueous zinc nitrite solution can be prepared by the method having an extreme industrial advantage.

What is claimed is:

1. An aqueous zinc nitrite solution which contains 100 ppm or less of calcium (Ca) ions, characterized in that, in terms of the aqueous zinc nitrite solution having an $NO_2$ concentration of 10% by weight, sodium (Na) ion concentration is 200 to 2000 ppm and sulfate ($SO_4$) ion concentration is 20 ppm or less in the solution.

2. An aqueous zinc nitrite solution according to claim 1, further comprising a stabilizing agent.

3. An aqueous zinc nitrite solution according to claim 2, wherein the stabilizing agent is one selected from the group consisting of alkali nitrite metal salts, sugars, and chelating agents.

4. A method for preparing an aqueous zinc nitrite solution which contains 100 ppm or less of calcium (Ca) ions, characterized in that, in terms of the aqueous zinc nitrite solution having an $NO_2$ concentration of 10% by weight, sodium (Na) ion concentration is 200 to 2000 ppm and sulfate ($SO_4$) ion concentration is 20 ppm or less in the solution, comprising synthesizing a zinc compound and an alkali metal nitrite as raw materials by a double decomposition reaction using an ion-change membrane as a diaphragm; and obtaining said aqueous zinc nitrite solution from said raw materials.

5. A method for preparing an aqueous zinc nitrite solution according to claim 4, characterized in that the reaction is performed in an electrodialysis cell having a unit including one concentration chamber and two desalting chambers sandwiching the concentration chamber which are formed by an alternate arrangement of cation-exchange membranes and anion-exchange membranes between an anode and a cathode.

6. A method for preparing an aqueous zinc nitrite solution according to claim 5, characterized in that an aqueous zinc compound solution is supplied to one of the desalting chambers and an aqueous alkali metal nitrite solution is supplied to the other of the desalting chambers, and zinc ions are introduced through a cation-exchange membrane and nitrite ions are introduced through an anion-exchange membrane into the concentration chamber sandwiched between the desalting chambers, to thereby obtain an aqueous zinc nitrite solution.

7. A method for preparing an aqueous zinc nitrite solution according to claim 4, characterized in that the zinc compound is zinc sulfate and the alkali metal nitrite is sodium nitrite.

* * * * *